Aug. 29, 1950  L. S. WALL  2,520,291
UNLOADING TRUCK
Filed Sept. 27, 1948  4 Sheets-Sheet 1
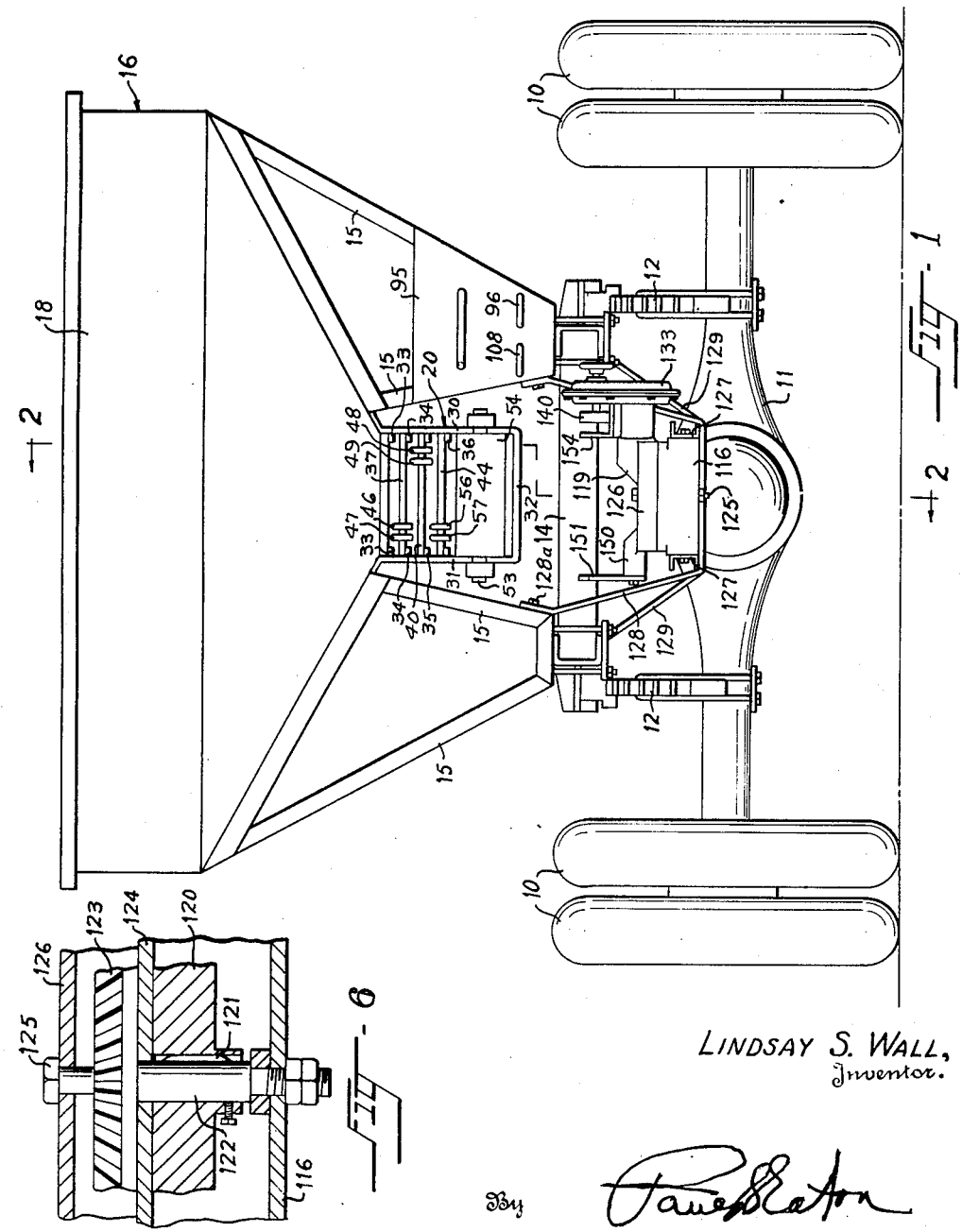
LINDSAY S. WALL,
Inventor.

Aug. 29, 1950 L. S. WALL 2,520,291
UNLOADING TRUCK
Filed Sept. 27, 1948 4 Sheets-Sheet 2
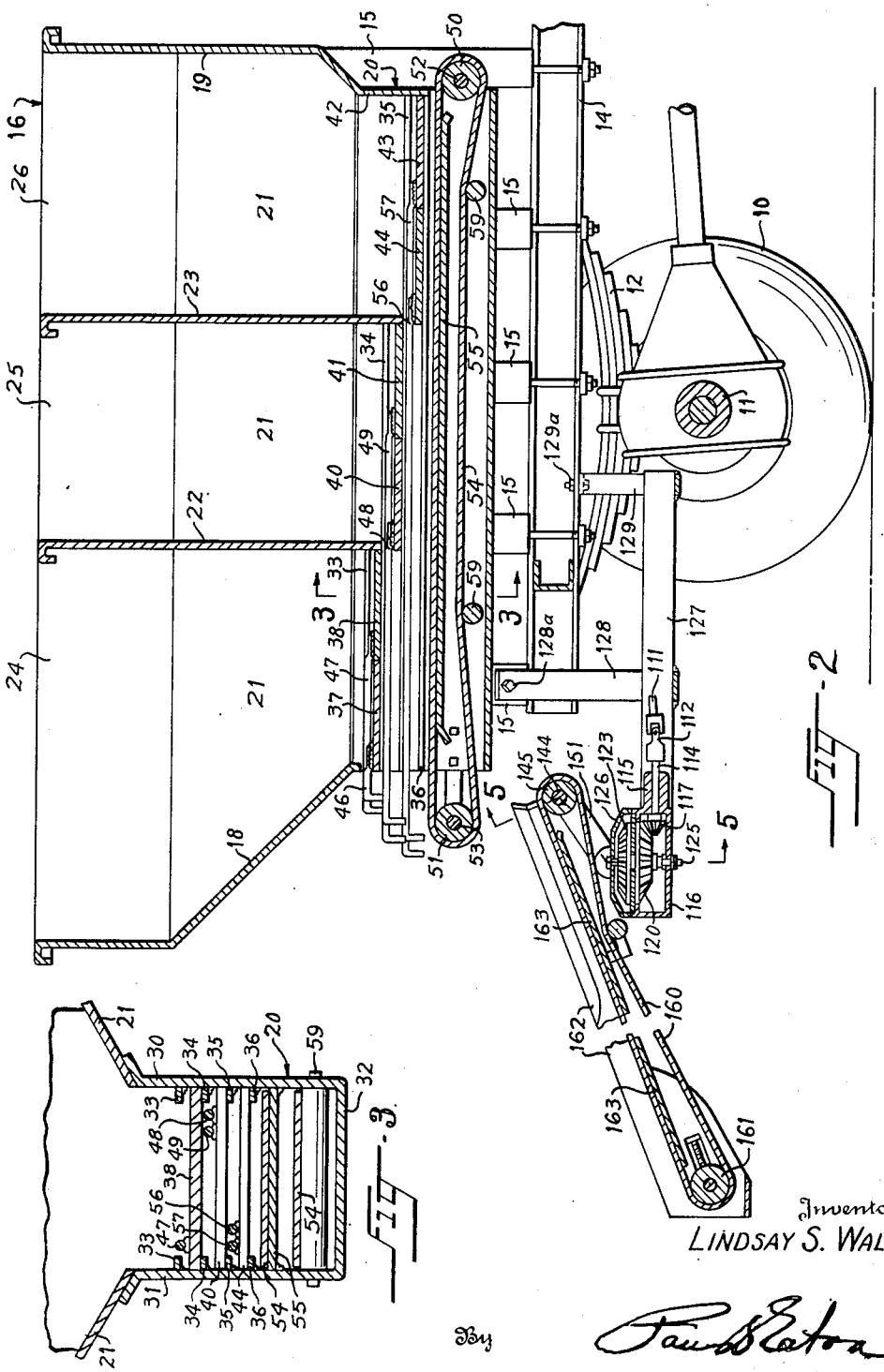
Inventor:
LINDSAY S. WALL.
By
Attorney

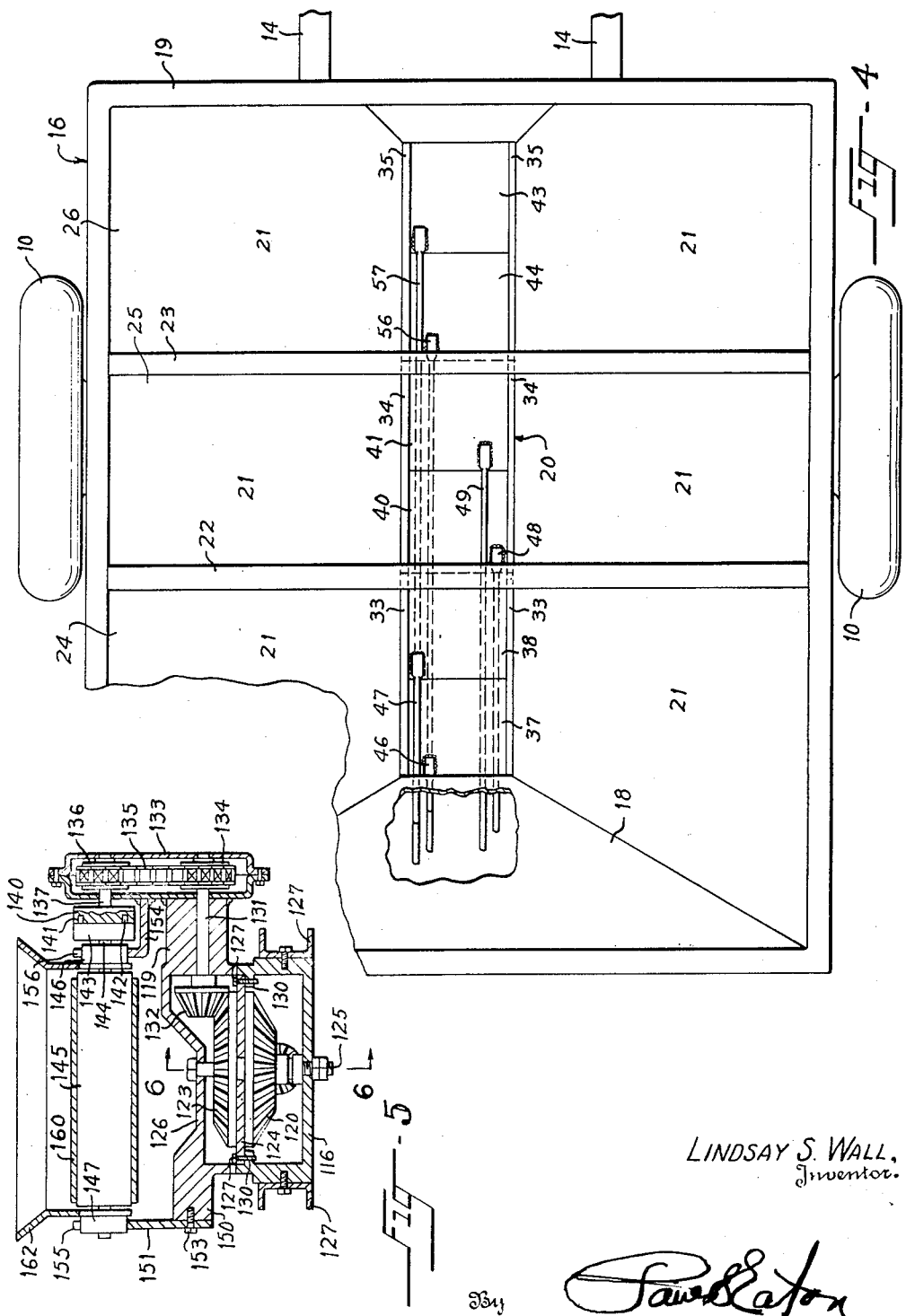

Aug. 29, 1950     L. S. WALL     2,520,291
UNLOADING TRUCK
Filed Sept. 27, 1948     4 Sheets-Sheet 4
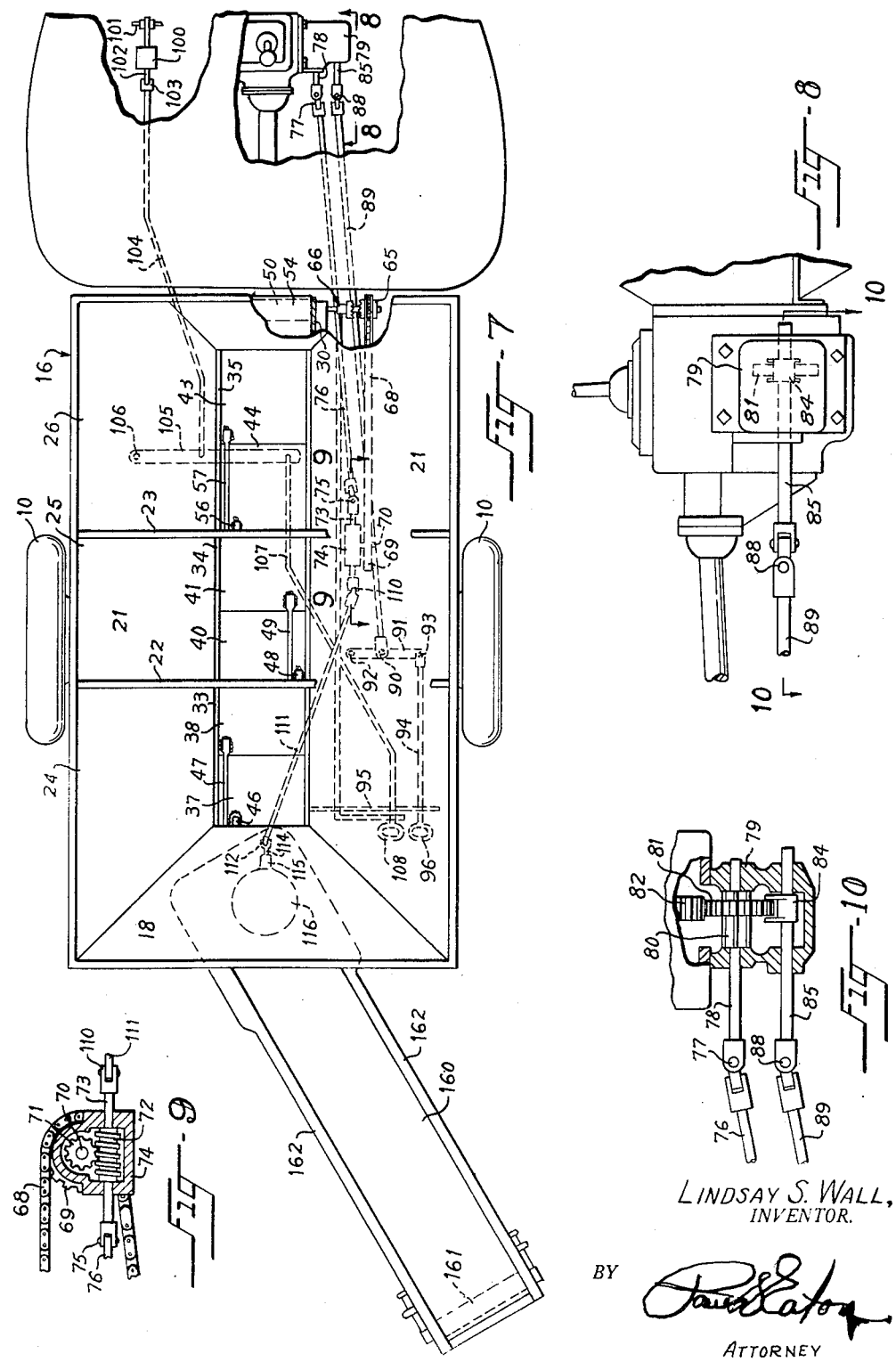
LINDSAY S. WALL,
INVENTOR.
BY
ATTORNEY Patented Aug. 29, 1950

2,520,291

UNITED STATES PATENT OFFICE 2,520,291

UNLOADING TRUCK

Lindsay S. Wall, Winston-Salem, N. C., assignor to Wall Manufacturing Company, Inc., Winston-Salem, N. C., a corporation of North Carolina Application September 27, 1948, Serial No. 51,419

10 Claims. (Cl. 214—83.2)

This invention relates to vehicular trucks for transporting bulk materials from one location to another, such as coal, crushed stone, gravel, and the like, and more especially to an improved means for unloading the materials from the same.

There have been many types of truck bodies for motor trucks, some of which have had transverse partitions therein, thus dividing the truck into two or more compartments and thereby providing means for delivering different types of material from the truck at one time. For instance, one of the compartments may have stove coal in the same, another of the compartments having soft coal therein, or the compartments may be filled with coal to be delivered to several different customers. However, prior to my invention as set forth in my Patent 2,284,853 of June 2, 1942, it has heretofore been necessary to deliver the material from the rearmost compartment in the truck body first and to then deliver the material from the compartment forwardly and adjacent thereto, or, in other words, to deliver the material from the compartments starting with the rearmost compartment and proceeding forwardly in succession, which has not been altogether satisfactory.

It is therefore an object of this invention to provide a motor truck, the body of which has a plurality of compartments therein and the bottoms of each of the compartments being longitudinally slidable independently of each other, said body also having an unloading conveyor mounted in its bottom to thereby provide means for unloading the material from any one of the compartments regardless of whether or not said compartment is disposed at the rear of the truck, the conveyor being provided to carry the material to the rear of the truck where it may be dumped onto a second conveyor or into any suitable container, as desired.

It is another object of this invention to provide manually controlled means disposed at the rear of the truck and having a connection between the same and the removable bottoms of the various compartments in the truck body so that the bottoms of these compartments may be opened at the will of the operator.

It is still another object of this invention to provide an unloading truck of the class described having a first conveyor and a second conveyor, which is universally mounted beneath the rearmost end of the first conveyor, and onto which the material from the first conveyor is delivered from the various compartments of the truck body and to further provide means for driving the universally mounted conveyor, said driving means being an improvement over my former Patent Number 2,284,853 of June 2, 1942.

Some of the objects of the invention having been stated, other objects will appear as the description proceeds, when taken in connection with the accompanying drawings, in which Figure 1 is a rear view of the truck body, omitting the second conveying means;

Figure 2 is a vertical sectional view taken substantially along the line 2—2 in Figure 1 and showing a portion of the second conveyor mounted thereon;

Figure 3 is an enlarged transverse vertical sectional view taken substantially along the line 3—3 in Figure 2;

Figure 4 is a top plan view of the truck body shown in Figure 2, but omitting the second conveying means;

Figure 5 is an enlarged vertical sectional view taken along the line 5—5 in Figure 2;

Figure 6 is an enlarged vertical sectional view taken along the line 6—6 in Figure 5;

Figure 7 is a top plan view showing the major portion of an unloading truck and showing the driving means associated therewith for driving the conveyors;

Figure 8 is an enlarged elevation taken along the line 8—8 in Figure 7, showing the power take-off mechanism associated with the truck motor;

Figure 9 is a sectional view taken along the line 9—9 in Figure 7, showing a gear reduction unit which is employed in the line of drive for the delivery conveyor in the bottom of the truck body;

Figure 10 is a sectional plan view taken along the line 10—10 in Figure 8.

Referring more specifically to the drawings, the numeral 10 denotes the rear wheels of a motor truck which are mounted at each end of axles disposed within an axle housing 11. The front wheels of the truck are conventional and are not shown. The axle housing 11 has mounted thereon conventional springs 12 for supporting the truck framework 14. Extending upwardly from the framework 14 are diverging struts 15, the upper ends of which support a bed broadly designated at 16. This bed has inclined side walls 21 and a rear wall 18, preferably inclined forwardly and downwardly; whereas the front wall 19 is preferably vertically disposed. The lower portions of the side walls 21 and the rear wall 18 converge inwardly into a suitable trough broadly designated at 20.

In order to form a plurality of compartments within the bed, suitable transverse partitions 22 and 23 are provided, thus dividing the bed into three compartments, 24, 25 and 26. The purpose of the partitions 22 and 23 is to separate measured quantities of materials so that the contents of one compartment may be delivered at one location and the materials in the other compartments can be delivered to other locations, and it is the primary object of this invention to provide means operable by an operator remote from the bed whereby the contents of any one of the compartments may be delivered independently of the others. That is, the material may be delivered from the compartment 26 if so desired, and then it may be delivered from the compartment 24 and then it may be delivered from the compartment 25, or in any other order that is desired.

Referring to Figures 2 and 3 it may be observed that the trough 20 comprises vertically disposed side walls 30 and 31 and a bottom 32 and is open at opposite ends thereof. The side walls 30 and 31 each have a plurality of longitudinally extending spaced guide members 33, 34, 35 and 36 secured to their inner surfaces as by welding and on the uppermost guides 33 and 34 are plates or closures 37 and 38 (Figures 2 and 3) which have horizontal sliding movement on the guide members 34.

Referring to Figure 2 it may be observed that the partition 22 extends downwardly into the trough 20 a substantial distance so the right-hand end of the plate 38 engages the lower edge of the partition 22. Mounted for horizontal sliding movement on the guide members 35 are plates or closures 40 and 41 which, as may be observed in Figure 2, are provided to close the bottom of the compartment 25. The plate 41 is adapted at its right-hand edge to engage the lower edge of the partition 23 which also projects into the trough 20 a substantial distance and somewhat lower than the lower edge of the partition 22.

The right-hand end of the trough 20 in Figure 2 is partially closed by a vertically disposed plate member 42, the lower end of which is adapted to be engaged by a plate or closure 43, there being another plate or closure 44 immediately to the left of the same, in Figure 2, said plates being slidably mounted on the guide members 36. These plates 43 and 44 are adapted to close the bottom of the compartment 26 as desired.

The plate or closure 37 has secured thereto as by welding an operating rod 46 which extends to the rear of the bed and has a right angular handle portion thereon. The plate 38 also has a control rod 47 secured thereto, which projects to the rear of the bed and has a right angular handle portion on its rear end. The plate 40 has a control rod 48 secured thereto which extends to the rear of the bed and has a right angular handle portion thereon. The plate 41 has a control rod 49 secured thereto which extends to the rear of the bed and has a right angular handle thereon. The plate 44 has a control rod 56 secured thereto which projects to the rear of the bed and has a right angular handle portion integral therewith. The plate member 43 has a control rod 57 secured thereto and which extends to the rear of the bed and has a right angular handle portion integral therewith. By grasping a handle portion for a particular control rod, its associated plate or closure member may be moved to allow the contents of a compartment to flow therefrom.

The trough 20 has rollers 50 and 51 disposed in the ends thereof, said rollers being mounted on shafts 52 and 53, respectively. Upon the rollers 50 and 51 a suitable endless conveyor belt 54 is mounted. If desired, instead of having the lower reach of the endless conveyor belt 54 supported by the bottom 32 of the trough 20, suitable idler rollers 59 may be mounted in the side walls 30 and 31 for supporting the lower reach of the endless conveyor belt 54. It is obvious in Figure 2 that the material which is adapted to be placed in the compartments is supported by the removable members 37, 38, 40, 41, 44 and 43. However, when any one of the handle portions of the control rods is pulled outwardly, thus moving one of the associated plates 37, 38, 40, 41, 44 and 43 outwardly, the material in the corresponding compartments 24, 25 and 26 would then be permitted to fall upon the upper reach of the conveyor belt 54 by gravity. By having two plates closing the bottom of each compartment, one of the plates can be moved to open position to allow a major portion of the contents of that compartment to flow out of the compartment before the other plate is moved, thus making it easier to move one plate than to move one large plate at a time. The lower surface of the upper reach of the conveyor belt 54 engages a transverse longitudinally extending supporting plate 55 welded between the vertical side walls 30 and 31 of the trough 20.

The roller shaft 52 (Figures 2 and 7) has rotatably mounted thereon a sprocket wheel 65. Also mounted on this shaft 52 is a clutch mechanism broadly designated at 66 (Figure 7) and which is identical to the structure shown in Figure 9 of my aforesaid patent, and further description of which is therefore deemed unnecessary.

A sprocket chain 68 is mounted on the sprocket wheel 65 and is also mounted on a second sprocket wheel 69 (Figures 7 and 9). The sprocket wheel 69 is fixedly secured on a shaft 70 which has a worm gear 71 secured thereon meshing with a worm 72 (Figure 9). The worm 72 is fixed upon a shaft 73 which is rotatably mounted in a housing 74 in which the worm and worm gear are disposed. Connected to the shaft 73 as at 75 is a link 76, the other end of which is connected as at 77 to a shaft 78 (Figures 7 and 10). The shaft 78 extends into a power take-off housing 79 and has integral therewith a longitudinally extending groove portion 80 disposed within the housing and on which the gear 81 is slidably mounted. This gear 81 engages a driving gear 82 in the conventional transmission of the truck.

The power take-off 79 as shown in Figures 7 and 10 is identical to that shown in said patent and is shown by way of illustration only. In Figure 10, the gear 81 is shown meshed with the driving gear 82. However, it is necessary to provide means for shifting the gear 81 on the grooved portion 80 of the shaft 78 so that rotation may be or may not be transmitted to the roller 50 on which the conveyor belt 54 is mounted, as desired.

A suitable forked member 84 (Figure 10) is adapted to straddle the gear 81 and is fixed on a shaft 85 which is mounted for horizontal sliding movement in the housing 79 in parallel relation to the shaft 78. Connected to the left-hand end of the shaft 85 in Figures 7, 8 and 10, as at 88, is a link 89, the other end of which is pivotally connected as at 90 to a lever arm 91, said lever arm having one end thereof pivotally connected as at 92 (Figure 7) to the framework 14 of the truck.

The free end of the lever arm 91 has pivotally connected thereto as at 93 a link member 94, said link member 94 extending to the rear end of the truck at a point adjacent the discharge end of the conveyor belt 54 and being mounted for horizontal sliding movement in a vertically disposed plate 95 secured to the rearmost of the struts 15 on the right-hand side of the truck body 16. The link member 94 (Figure 7) has a suitable handle portion 96 formed on the rear end thereof which is adapted to be grasped by an operator for shifting the position of the gear 81 disposed in the housing 79. There is provided a clutch actuating mechanism which is very similar to the clutch shown in said patent and which is hereinafter described.

Before the gear 81 may be shifted into engagement, or out of engagement, with the driving gear 82, it is necessary to actuate the conventional clutch pedal of the truck. This mechanism is likewise operable at the rear end of the truck adjacent the discharge end of the conveyor 54. The clutch pedal 100 (Figure 7) is pivoted as at 101 in a conventional manner and has an extension 102 extending downwardly therefrom below the pivot point 101 and this extension 102 has pivotally connected thereto as at 103 a link member 104, said link member 104 extending to a medial portion of a lever arm 105 pivotally secured as at 106 to the truck frame 14. This lever arm 105 has a link member 107 pivotally connected to the free end thereof which extends rearwardly and slidably penetrates the vertically disposed plate 95 and has a suitable handle portion 108 on the rear end thereof which is adapted to be grasped by an operator and pulled outwardly away from the plate 95 for disengaging the conventional clutch mechanism, not shown, of the truck, after which the handle portion 96 may be moved inwardly toward the vertically disposed plate 95 to thus actuate the members 84, 85, 89, 91 and 94 to shift the gear 81 into or out of engagement with the driving gear 82, as desired.

By referring to Figures 2, 7 and 9, it may be observed that the shaft 73 also has connected thereto as at 110 a link member 111, said link member 111 having its other end connected as at 112 to a shaft 114. The shaft 114 is rotatably mounted in an outwardly projecting portion 115 of a gear housing 116. The shaft 114 has a bevel gear 117 fixedly mounted thereon which meshes with a large bevel gear 120 which is keyed as at 121 (Figure 6) to a tubular hub portion 122 integral with a bevel gear 123 disposed above the bevel gear 120 in Figure 6.

The housing 116 has a horizontally disposed partition 124 therein which is slidably penetrated by the hub portion 122 of the gear 123 and the hub portion 122 is rotatably mounted on a vertically disposed bolt 125 which slidably penetrates a second housing 126 which is mounted for partial rotational movement on the gear housing 116 and the bolt 125. The horizontally disposed partition 124 (Figure 5) is secured as by screws 127 to inwardly projecting ears 130 integral with the side walls of the housing 116. Referring to Figures 1 and 2 it may be observed that the housing 116 is suitably supported between the rearmost ends of the horizontally disposed channel bars 127 which are welded to transverse strap iron members 128 and 129. The strap iron member 128 is secured as by screws 128a to the rearmost of the struts 15 that support the truck bed 16 and the strap iron member 129 is secured as by bolts 129a to the frame work 14 of the truck. The second housing 126 (Figure 5) has an outwardly projecting portion 119 integral therewith in which a shaft 131 is rotatably mounted having a bevel gear 132 on the innermost end thereof which is adapted to engage the bevel gear 123. The outer end of the shaft 131 extends into a housing 133 and has a sprocket wheel 134 fixedly secured thereon on which a sprocket chain 135 is mounted. The sprocket chain 135 extends upwardly and is mounted on a sprocket wheel 136 secured on a transverse shaft 137 rotatably mounted in opposite walls of the housing 133 and this shaft 137 extends outwardly through one of the walls of the housing 133 and has a disk-shaped coupling member 140 mounted on the outer end thereof. This coupling member 140 has a plurality of cavities 141 therein which are adapted to be engaged by pins 142 extending from an enlarged portion 143 of a shaft 144 (Figure 5). The shaft 144 has a roller 145 secured thereon which is a part of the second conveyor. Disposed at each side of the roller 145 are circular bearing blocks 146 and 147, the proximate surfaces of which are spaced apart slightly from the remote ends of the roller 145 and have welded to the proximate ends thereof vertical side wall members of a trough 162.

The second housing 126 has an outwardly extending portion 150 on the opposite side from the portion 130 and has a support plate 151 secured thereto as by a screw 153 (Figure 5). Welded to the left-hand wall of the housing 133 and extending inwardly and upwardly is an L-shaped support plate 154. The plate 154 as well as the plate 151 have open-ended slots 155 and 156, respectively, therein in which the bearing blocks 147 and 146 are inserted to thus removably support the right-hand end of the second conveyor in Figure 2.

Attention is called to the fact that the bevel gear 123 as well as the bevel gear 120 disposed therebelow have sliding movement on the opposite surfaces of the transverse partition 124 in the housing 116. It is obvious, therefore, that when the gear 81 is in engagement with the driving gear 82 (Figure 10) rotation is transmitted to the gear reduction box 69 and thus through the link member 111 to the housing 116 (Figures 2 and 7). Now, as this shaft 111 rotates, it transmits rotation to the shaft 114 on which the bevel gear 117 is mounted and the bevel gear 120 will be caused to rotate and, it being keyed to the tubular hub portion 122 of the bevel gear 123, will thus transmit rotation to the same and these gears 120 and 123 will rotate in the housing 116 around the bolt 125.

Now, as the bevel gear 123 is caused to rotate, this will transmit rotation to the bevel gear 132 (Figure 5) and thus transmit rotation to the shaft 131 on which the sprocket wheel 134 is mounted. This will transmit rotation to the sprocket wheel 136 which will, in turn, transmit rotation to the roller 145. Now, this conveyor roller 145 has a conveyor belt 160 mounted thereon, the other end of which is mounted in the vertical side walls of the trough 162, the upper end of which is welded to the bearing blocks 146 and 147 in Figure 5 as has been heretofore described. The trough 162 has a bottom plate 163 thereacross which serves as a support for the upper reach of the conveyor belt 160 and on which the upper reach of the conveyor belt 160 has sliding movement.

It is thus seen that by sliding the shaft 144 from right to left in Figure 5 the pins 142 may be withdrawn from the cavities 141 in the disk member 140 and thus the entire second conveyor and the trough 162 may be easily removed from the supports 151 and 154 and may be carried in the truck body 16 until it is desired to unload one of the compartments in the truck body.

As the material in the compartments 24, 25 and 26 is being carried from one location to another by the truck, it is obvious that the gear 81 would be moved out of engagement with the driving gear 82 (Figure 10) in the manner heretofore described and it is manifest that the conveyor belt 54 would then remain stationary as well as the gears 120 and 123 in the housing 116.

When the truck has reached its destination and one or the other of the compartments is to be emptied, it is merely necessary for an operator to grasp one of the handles having the control rods 46, 48 and 56 integral therewith and to thus move the plates 37, 40 or 44 in the respective compartments 24, 25 or 26, from left to right in Figure 2 to thus permit the material contained therein to fall, by gravity, onto the upper reach of the conveyor belt 54. In the meantime, the gear 81 will have been moved into engagement with the driving gear 82 in Figure 10 to thus transmit rotation to the worm 72 (Figure 9) and to thus transmit rotation to the roller 50, through the link member 76, through the sprocket wheel 69, the chain 68 and the sprocket wheel 65, it being assumed that the clutch mechanism indicated at 66 has been engaged in such a manner as to transmit rotation from the sprocket wheel 65 to the shaft 52 on which the roller 50 is mounted.

This will drive the conveyor belt 54 so the upper reach of the same will move from right to left in Figure 2 and will thus convey the material from the desired compartment to the upper reach of the conveyor belt 160 onto which it will fall by gravity, from the conveyor belt 54 (Figure 2), the conveyor 160 being driven in the manner heretofore described.

After the material has fallen from the compartment desired, and through the rearmost of the plates 37, 40 or 44, the foremost of the plates 38, 41 or 43 are then moved from right to left along with the rearmost of the plates to thus entirely open the bottom of the associated compartment and to thus completely empty all of the contents of the desired compartment onto the conveyor belt 54.

It is thus seen that I have provided means whereby the contents of any one of a plurality of compartments in a truck body may be emptied independently of each other in any desired succession regardless of the relative position of the compartments to each other and I have also provided means whereby the compartments may all be emptied at one time onto the conveyor belt 54, if so desired, however, it is obvious that this would create a very heavy load on the conveyor belt and it is not likely that more than one of the compartments would be emptied at one time.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In combination, a motor driven truck having a bed provided with downwardly converging side walls and front and rear walls, a trough extending longitudinally of the bed and being disposed below the lower edges of said converging side walls, a conveyor disposed in said trough, driving means for the conveyor, a plurality of removable plates covering the trough whereby material may be supported by the removable plates during transportation of the truck from one location to another, said plates being slidably mounted in different horizontal planes in said trough and individual means secured to each plate and extending rearwardly of the rear end of the trough whereby a plate may be removed by sliding desired plates past any plates disposed rearwardly thereof for emptying the contents of a portion of the truck bed onto the conveyor.

2. In combination, a motor driven truck having a hopper thereon provided with downwardly converging side walls and front and rear walls, at least one vertically disposed partition extending between the side walls to thus divide the hopper into a plurality of compartments, a trough extending longitudinally of the hopper and being disposed below the lower edges of said converging side walls, each of said compartments having an opening at the bottom thereof communicating with the trough, a closure member for each of said openings, said closure members being slidably mounted in different horizontal planes in said trough, a conveyor disposed in said trough, the rear end of said conveyor terminating adjacent the rearmost wall of the hopper, a universal mounting disposed substantially below the rear end of the longitudinally extending conveyor, a second conveyor mounted at a point intermediate its ends on the universal mounting, means for driving said conveyors and individual means secured to each closure member and extending to the rear of said trough for independently removing the closure members from over the openings between the compartments and the first-named conveyor for emptying the contents from any one of the compartments onto the conveyor as desired.

3. In combination, a motor driven truck having a bed provided with downwardly converging side walls and front and rear walls, an open-topped trough extending longitudinally of the bed and being disposed below and secured to the lower ends of said converging side walls, at least one vertically disposed partition disposed between the downwardly converging side walls thus providing a plurality of compartments in the bed, a pair of juxtaposed horizontal plates disposed on the same horizontal plane closing the opening between each of the compartments and the trough disposed therebelow, a conveyor disposed in said trough, the end of said conveyor terminating rearwardly of the lower edge of the rear wall, a universal mounting located substantially below the rearmost end of the conveyor, a second conveyor mounted at a point intermediate its ends on the universal mounting, manually controlled means extending to one end of the bed for moving the pairs of plates out of the openings between the compartments and the trough independently of each other.

4. In a structure according to claim 3, manually controlled means for moving either one of the two plates away from each of said openings independently of each other.

5. In a structure according to claim 4, said means for controlling the position of the plates covering the openings between the compartments and the trough comprising a control rod connected to each one of the plates, said control rods extending from said plates to the rear end of the trough and having handle portions integral therewith whereby said handle portions may be grasped by an operator and moved rearwardly of the truck bed to thus move the corresponding plate out of the opening between a compartment and the trough.

6. In combination, a motor driven truck being provided with a bed having a pair of downwardly converging side walls and front and rear walls, a trough extending longitudinally of the bed and being disposed below and joined to the lower edges of the side walls, a plurality of vertically disposed partitions disposed between the side walls and extending downwardly a substantial distance into the trough, a conveyor disposed in said trough, means for driving the conveyor, said trough having vertically disposed side walls and a plurality of longitudinally extending guideways integral with the proximate surfaces of said trough side walls, a plurality of closure members mounted for sliding movement on the guideways, and being disposed at different horizontal planes relative to each other, the uppermost of said closure members being adapted to engage the lower edge of the first of said vertically disposed partitions, the plate disposed immediately therebelow being adapted to pass beneath the lower edge of the first vertically disposed partition and being adapted to engage the lower edge of the second of the vertically disposed partitions, said bed also being provided with a front wall and whereby the closure member disposed below the second closure member may pass below the lower edge of the second named partition and is adapted to engage the lower edge of the front wall of the truck bed and to cover the area defined between the second named partition and rear wall and the side walls at the lower ends thereof, manually operable means for sliding the plates longitudinally of the trough to thus leave the openings previously covered by the plates unrestricted for depositing the contents disposed between any two of the partitions onto the conveyor as desired for delivering the contents to the rear of the truck bed.

7. In combination, a motor driven truck having a bed thereon, a trough extending longitudinally of the bed and being disposed below the said bed, said bed having a plurality of compartments therein and the bottoms of said compartments communicating with the longitudinally extending trough, a plurality of slidable plates mounted in different horizontal planes and being adapted to close the openings between the bottoms of said compartments and the trough, a conveyor disposed in said trough, means for driving said conveyor, means for independently sliding the plates disposed in the openings between the compartments longitudinally of the bed and the trough for emptying the contents in said compartments onto the conveyor and to thereby convey the material from the desired compartment to the rear of the truck bed.

8. Apparatus for dispensing coal and the like, comprising a bed provided with side walls and a rear wall and a front wall, said bed being provided with a plurality of vertically disposed transverse partitions dividing the bed into a plurality of compartments, a driven conveyor belt mounted below the bed and extending longitudinally of the same the entire length of the bed, each compartment being provided with a longitudinally slidable bottom, said bottoms being mounted in different horizontal planes to permit telescopic movement thereof relative to each other and individual means secured to each slidable bottom and extending to the exterior of the bed for moving a bottom for any desired compartment longitudinally of the bed to thereby allow the contents of the same to be emptied onto the driven conveyor.

9. In combination, a motor driven truck having a bed provided with downwardly converging side walls and front and rear walls, a longitudinally extending trough disposed below and secured to the lower ends of said converging side walls and having a first conveyor disposed in said trough and said truck having removable bottoms disposed between the trough and the truck's bed, a universally mounted second conveyor disposed adjacent the rear end of the first conveyor whereby the contents of the truck bed may be dumped onto the first conveyor and delivered from the first conveyor to the second conveyor, the second conveyor comprising a fixed housing secured to the truck, a rotatable housing mounted on the upper side of the fixed housing the axis of which is on a vertical plane, a horizontal partition secured in the fixed housing and separating the fixed housing from the rotatable housing, a bolt slidably penetrating the fixed housing and the horizontally disposed partition and the rotatable housing at its axis, a bevel gear rotatably mounted on the bolt and engaging the top surface of the horizontal partition, said bevel gear having a tubular hub portion integral therewith, said hub portion being rotatably mounted in the horizontal partition and extending downwardly therethrough, a second bevel gear secured on said tubular hub portion of the first bevel gear, a horizontally disposed shaft rotatably mounted in the fixed housing and extending from the inside thereof to the outside thereof and having a bevel gear mounted on the inside thereof meshing with the second bevel gear, means for driving the horizontally disposed shaft, a second horizontally disposed shaft extending out of the rotatable housing and having a bevel gear on the inside end thereof meshing with the first of the bevel gears and having a sprocket wheel on the outside end thereof, said second conveyor having rollers, a conveyor belt mounted on the rollers, a sprocket wheel connected to one of the rollers, and a sprocket chain connecting the first sprocket wheel to the second sprocket wheel, whereby rotation of the first-named horizontally disposed shaft transmits rotation to the interconnected bevel gears the axis of which are disposed on a vertical plane and whereby the uppermost of the bevel gears transmit rotation to the bevel gear on the second-named horizontally disposed shaft to thus impart rotation to the sprocket wheels and the sprocket chain associated therewith and to thus drive the roller having the sprocket wheel mounted thereon to thus transmit motion to the conveyor belt.

10. In a structure according to claim 9, said connection between the second-named sprocket wheel and the driven roller on which the conveyor belt is mounted comprising a shaft on which the driven roller is fixedly mounted, said shaft having a clutch member thereon, a second shaft disposed in alinement with the shaft on which the roller is mounted and the second-named sprocket wheel being mounted on one end thereof, a mating clutch member mounted on the other end of said second-named shaft for engaging the clutch member on the shaft on which the roller is fixedly mounted.

LINDSAY S. WALL.

REFERENCES CITED

The following references are of record in the file of this patent:

UNITED STATES PATENTS

| Number | Name | Date |
|---|---|---|
| 1,122,273 | Hansen | Dec. 29, 1914 |
| 1,762,240 | Pickard | June 10, 1930 |
| 2,275,799 | Oklejas | Mar. 10, 1942 |
| 2,284,853 | Wall | June 2, 1942 |
| 2,300,753 | Wagner et al. | Nov. 3, 1942 |
| 2,451,656 | Birch | Oct. 19, 1948 |